(12) United States Patent
Hartmann et al.

(10) Patent No.: US 11,148,793 B2
(45) Date of Patent: Oct. 19, 2021

(54) SYSTEM FOR TRANSMITTING AND PROCESSING DATA FOR CONTROLLING A ROTOR BLADE ACTUATOR

(71) Applicant: ZF Friedrichshafen AG, Friedrichshafen (DE)

(72) Inventors: Steffen Hartmann, Münden (DE); Daniel Fürst, Kassel (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 345 days.

(21) Appl. No.: 16/320,801

(22) PCT Filed: Jun. 28, 2017

(86) PCT No.: PCT/EP2017/065944
§ 371 (c)(1),
(2) Date: Jan. 25, 2019

(87) PCT Pub. No.: WO2018/019506
PCT Pub. Date: Feb. 1, 2018

(65) Prior Publication Data
US 2019/0168867 A1    Jun. 6, 2019

(30) Foreign Application Priority Data
Jul. 26, 2016    (DE) .......................... 102016213720.4

(51) Int. Cl.
*B64C 27/32*    (2006.01)
*B64C 27/00*    (2006.01)
(Continued)

(52) U.S. Cl.
CPC ............ *B64C 27/32* (2013.01); *B64C 27/001* (2013.01); *B64C 27/72* (2013.01); *H04B 1/3822* (2013.01); *Y02T 50/30* (2013.01)

(58) Field of Classification Search
CPC ....... B64C 27/32; B64C 27/001; B64C 27/72; H04B 1/3822; Y02T 50/30
(Continued)

(56) References Cited

U.S. PATENT DOCUMENTS 5,938,404 A    8/1999    Domzalski et al.
5,970,393 A    10/1999    Khorrami et al.
(Continued)

FOREIGN PATENT DOCUMENTS

DE    693 10 111 T2    8/1997
DE    198 21 268 C2    3/2001
(Continued)

OTHER PUBLICATIONS

Search report/office communication for DE 10 2016 213 720.4, dated Jul. 26, 2016, 12 pp.

*Primary Examiner* — Gertrude Arthur Jeanglaude
(74) *Attorney, Agent, or Firm* — Crowell & Moring LLP

(57) ABSTRACT

The invention relates to a system for the data transfer and processing for the controlling of a rotor blade actuator, the system comprising:
an adjusting device (2) that is arranged within the rotating system (10) of the helicopter, which is configured to provide at least one first rotor blade actuator (1);
a first control system (3) that is arranged within the rotating system and that is coupled via signals (11) to the adjusting device (2);
a first sensor (4) that is arranged within the rotating system (10) which is designed to detect at least one first control variable of the rotor blade actuator (1) in the time domain and to transmit this control variable in the time domain to the first control system (3) via a second signal-based coupling (12);
wherein the first control system (3) is configured to receive the first control variable via the signal-based
(Continued)

Figure 1:
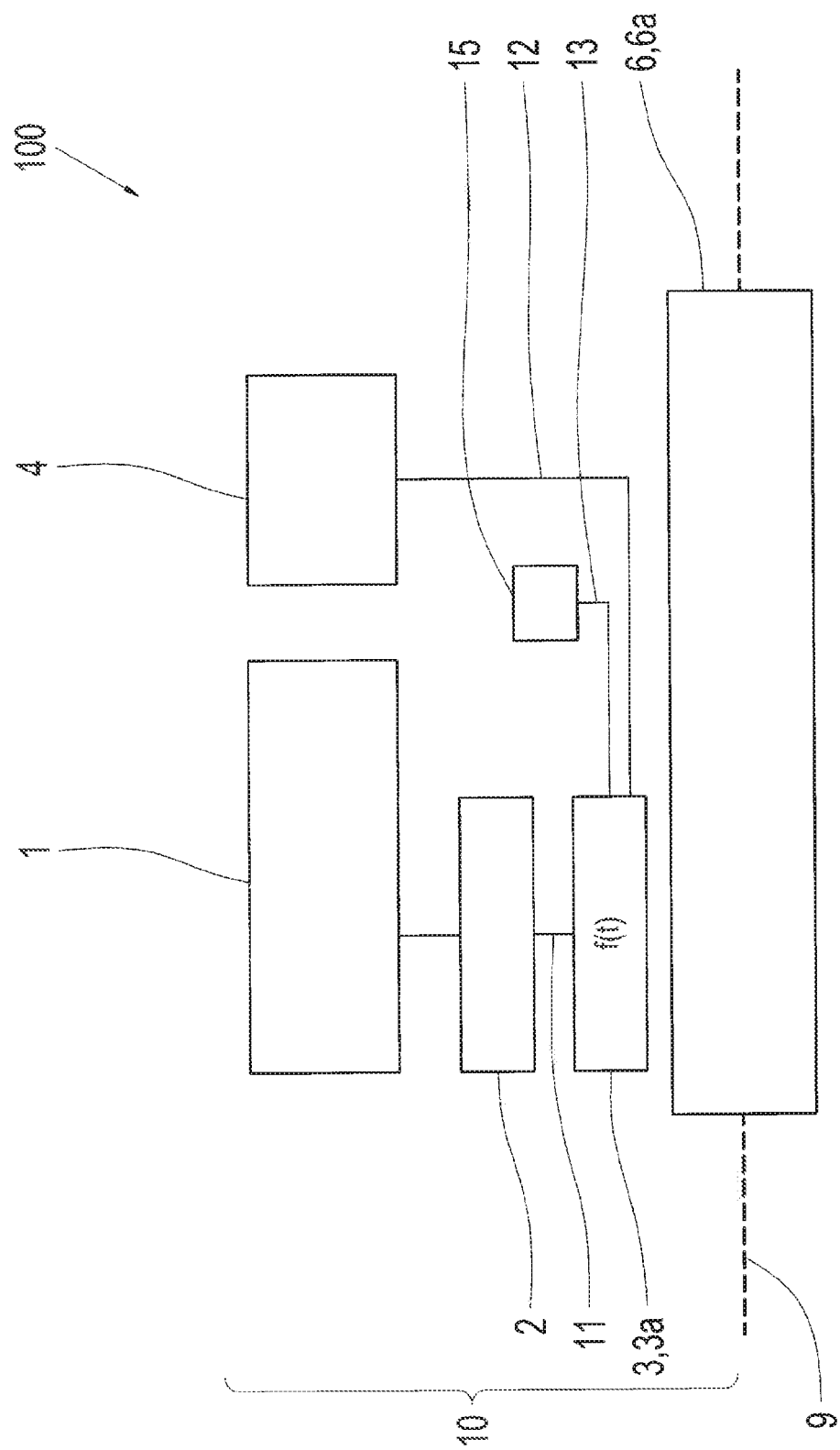

coupling (12), to determine at least one first control value in the time domain by using the received control variable in the time domain and by using at least one first control algorithm, and to transmit this control value to the adjusting device (2) via the first signal-based coupling (11), wherein the adjusting device (2) is designed to receive this control value via the first signal-based coupling (11).

16 Claims, 9 Drawing Sheets

(51) Int. Cl.
    *B64C 27/72*     (2006.01)
    *H04B 1/3822*     (2015.01)

(58) Field of Classification Search
    USPC ............................................................ 701/3
    See application file for complete search history.

(56) References Cited

U.S. PATENT DOCUMENTS

| | | | |
|---|---|---|---|
| 6,499,690 B1 | 12/2002 | Katayama et al. | |
| 7,176,812 B1 | 2/2007 | Kelley | |
| 2004/0251383 A1 | 12/2004 | McDonnell | |
| 2005/0257956 A1 | 11/2005 | Marshall et al. | |
| 2005/0260870 A1 | 11/2005 | Marshall et al. | |
| 2009/0228318 A1* | 9/2009 | Ara | G06Q 10/06398 705/7.42 |
| 2012/0116612 A1 | 5/2012 | Andrews | |
| 2012/0261509 A1 | 10/2012 | Brewer et al. | |
| 2012/0261519 A1 | 10/2012 | Brewer et al. | |
| 2014/0249777 A1* | 9/2014 | Tanaka | G05B 23/0232 702/183 |
| 2014/0314130 A1 | 10/2014 | Sane et al. | |
| 2015/0019596 A1* | 1/2015 | Tanaka | G05D 23/1917 707/812 |

FOREIGN PATENT DOCUMENTS

| | | |
|---|---|---|
| DE | 101 16 479 C2 | 12/2003 |
| DE | 600 02 851 T2 | 3/2004 |
| DE | 699 17 520 T2 | 6/2005 |
| DE | 10 2008 050 586 A1 | 5/2010 |
| EP | 2 572 982 A1 | 3/2013 |

\* cited by examiner

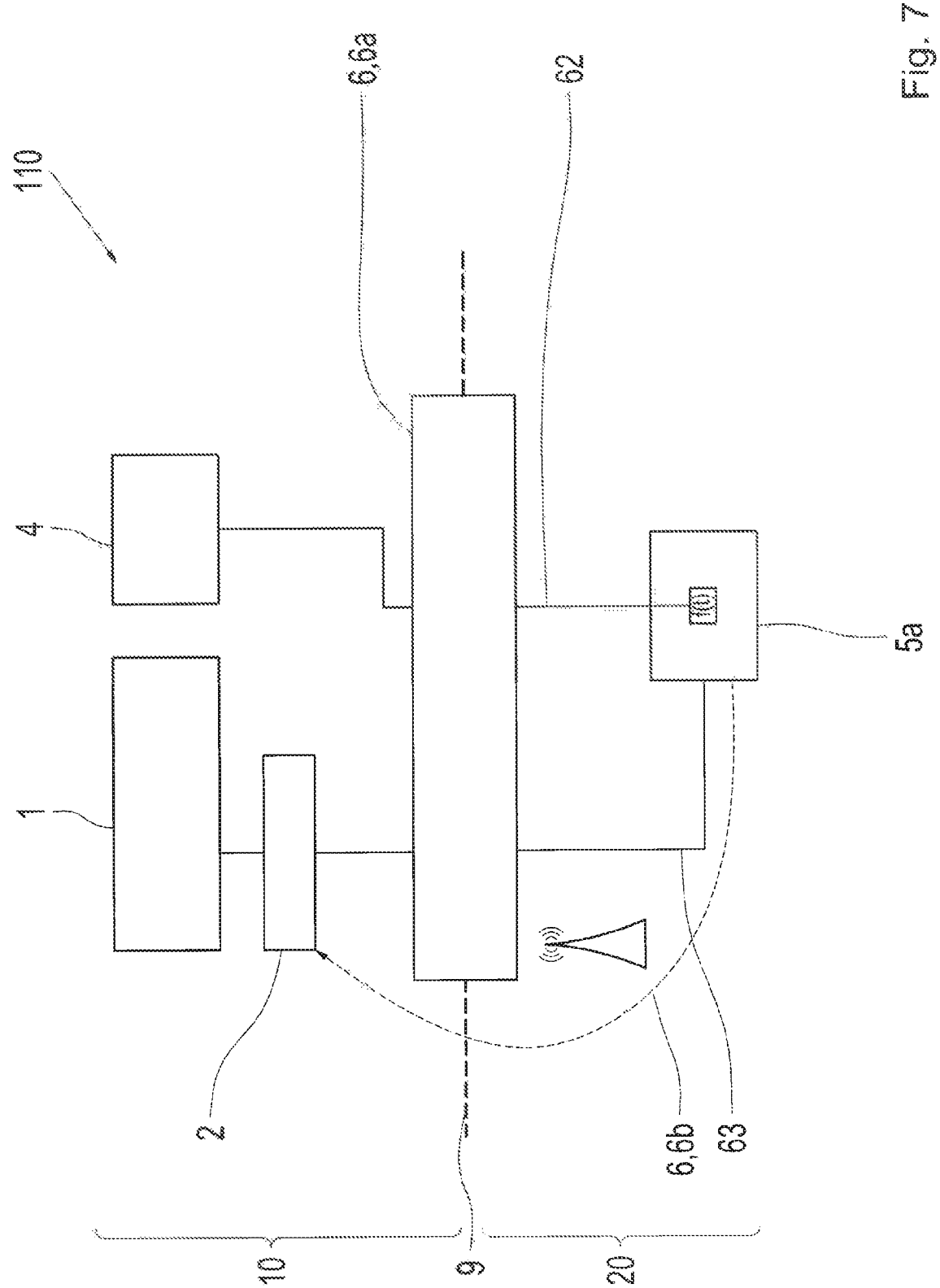

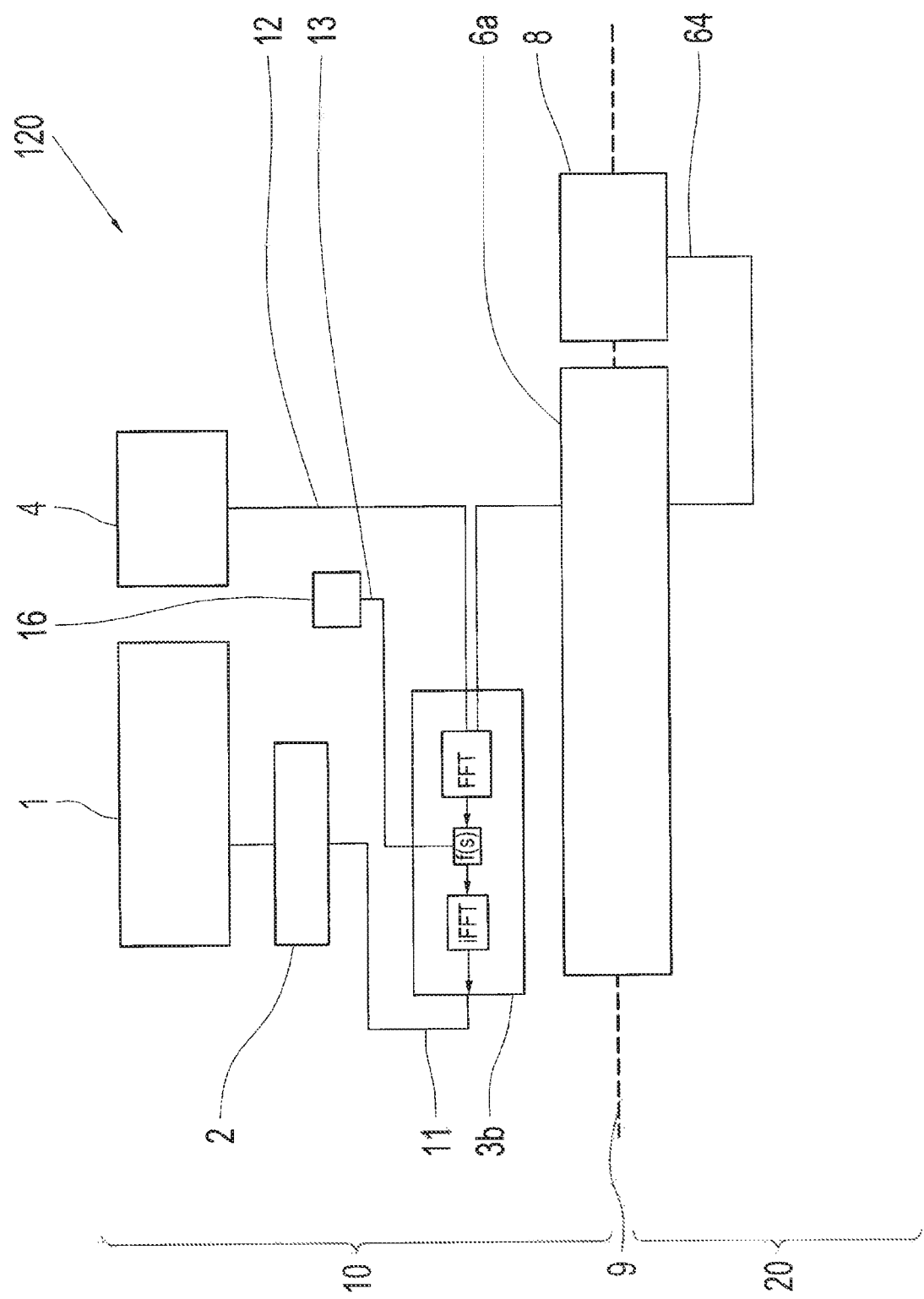

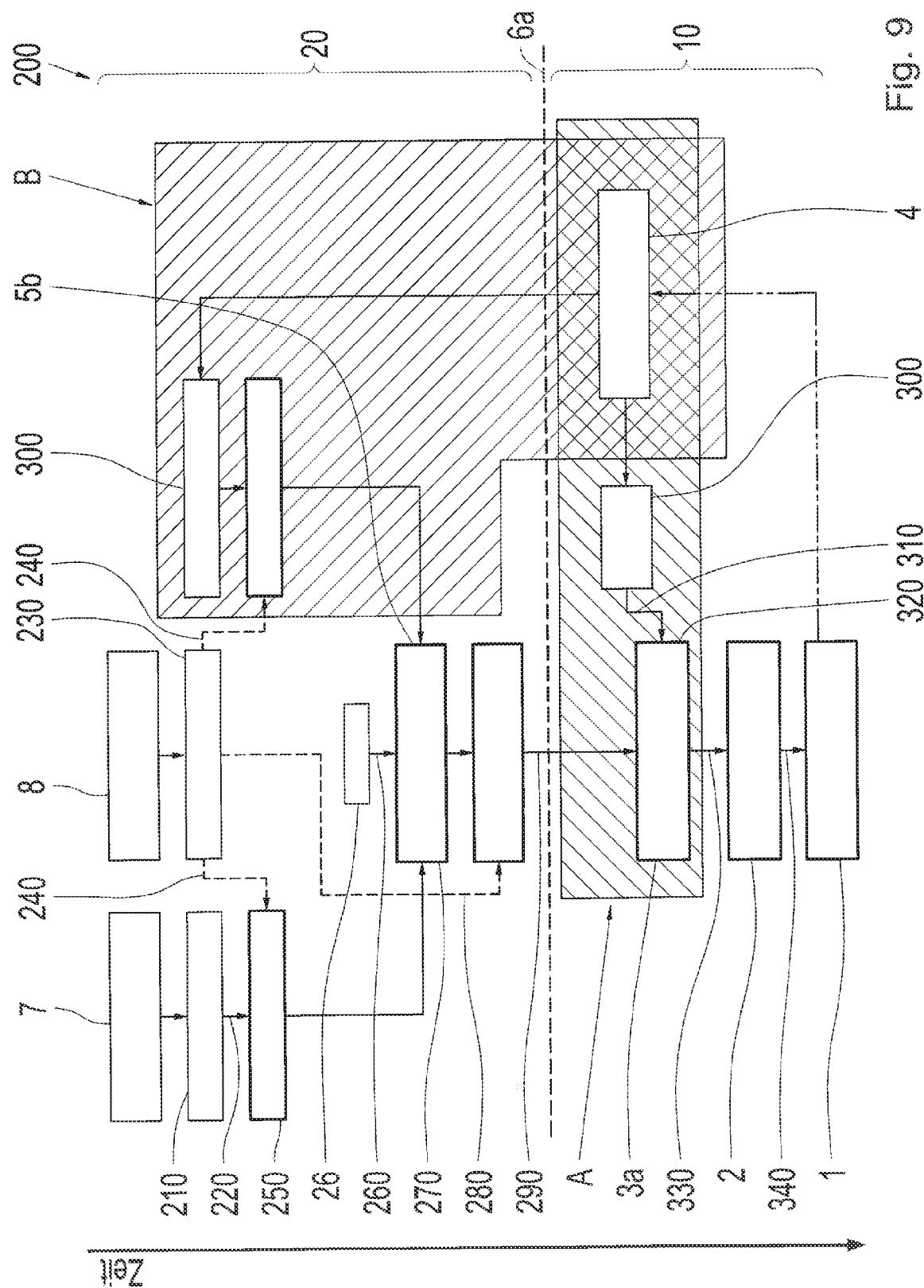

SYSTEM FOR TRANSMITTING AND PROCESSING DATA FOR CONTROLLING A ROTOR BLADE ACTUATOR

This application is a filing under 35 U.S.C. § 371 of International Patent Application PCT/EP2017/065944, filed Jun. 28, 2017, and claims the priority of DE 10 2016 213 720.4, filed Jul. 26, 2016. These applications are incorporated by reference herein in their entirety.

The invention relates to a system for transmitting and processing data for controlling a rotor blade actuator.

Such a system is known from the US20140314130A1. In the rotating system on the rotor head, sensor data are transformed from the time domain to the frequency domain via Fast Fourier Transformation (FFT). This sensor data is transferred into the cell, or into the stationary system. In the cell, the sensor data is transformed back into the time domain via inverse Fast Fourier Transformation (iFFT). A time domain controller uses the time domain sensor data that has been transformed back in order to generate time domain set values. The time domain set values are transformed into frequency domain set values via FFT. The frequency domain set values are transferred to the rotor head, or into the rotating system. On the rotor head, the set values are transformed back into the time domain via iFFT.

To ensure that the signals, which are transformed back and forth can be processed in a meaningful way on the rotor head and in the cell or that they can be used for controlling purposes, it is necessary that the same or at least a mutually known phase definition is used in both systems. This means that the same time base must be used for the FFT and the iFFT. Generally, this is achieved in that the respective values are represented as harmonic components of the main rotor speed (n/rev). To accomplish this, a sensor for the determination of the location or for the determination of the angle of the main rotor is required on the rotor head as well as in the cell.

It is the objective of the present invention to provide an improved system for the controlling of a rotor blade actuator. It is the particular objective of the invention to minimize the computation effort and the diversity of parts and thus to provide more cost-efficient systems for the data transfer and processing for the controlling of a rotor blade actuator. Another task is to provide an improved method for the data transfer and processing for the controlling of a rotor blade actuator.

This task is solved in accordance with the invention by means of a system for the data transfer and processing for the controlling of a rotor blade actuator, the system comprising an adjusting device that is arranged within the rotating system of the helicopter, which is configured to provide at least one first rotor blade actuator; a first control system that is arranged within the rotating system and that is coupled to the adjusting device via signals; and a first sensor that is arranged within the rotating system, which is designed to detect at least one first control variable of the rotor blade actuator within the time domain and to transmit this control variable in the time domain to the first control system via a second signal-based coupling; wherein the first control system is configured to receive the first control variable via the signal-based coupling, to determine at least one first control value in the time domain by using the received control variable in the time domain and by using at least one first control algorithm, and to transmit this control value to the adjusting device via the first signal-based coupling, wherein the adjusting device is designed to receive this control value via the first signal-based coupling.

The rotor blade actuator or just actuator that is arranged within the rotating system, e.g. on the rotor head can generate movements and/or forces and/or torque in accordance with a higher priority function of a corresponding control device. The actuator can e.g. refer to an adjustable control rod, which can be driven for example, hydraulically, pneumatically, electrically or by means of other energy sources.

The actuator can e.g. refer to primary control actuators, to actuators which additively overlay movements onto the actual primary control movement and/or to actuators that are not directly involved in the movement of the rotor blades, but whose control value comprises features to influence the flight characteristics, for example by means of masses that rotate with variable speed in order to reduce vibrations.

By means of one or more sensors, one or more measuring values, i.e. actuator control variables or control variables are directly or indirectly detected, which are necessary for the local controlling of the actuators. These sensors can be arranged e.g. on the rotor head and can for example, be integrally formed with the actuator. The measuring of the control variables can be carried out in a time-continuous or time-discrete manner within the time domain.

The adjusting device can e.g. be a control element, in particular one that is configured in form of a power electronic control element or as a valve. Depending on its design, the control element can also be integrally included in the first control system and it can be arranged on the rotor head.

The first control system can particularly refer to a first controller that can process sensor signals, e.g. by means of a conditioning, filtering, A/D conversion, etc. By means of a control algorithm and taking into account the dynamic characteristics of the actuator that is to be regulated or adjusted, the controller calculates the corrective measures for regulating or adjusting from a control deviation which was caused e.g. by a disturbance. For this purpose, the first controller can be supplied with one or more reference values, i.e. set values within the time domain. In such a case it is also referred to as a time domain controller.

The reference value refers to a definable value at which the control variable is to be held by means of the control system. It is a value that is not influenced by the control system and it is supplied from the outside.

The control variable refers to the variable at the outset, i.e. to the actual value of the controlled section, which is lead back for the purpose of controlling and for comparing.

The control deviation is understood to be the difference between the reference value and the control variable. The control deviation is the actual input variable of the control system.

The regulating value or control value is the output value of the control system and at the same time the input value of the controlled section. It transfers the controlling effect of the controller to the controlled section.

The signal-based coupling or connection can be carried out in a wireless and/or in a wired manner.

It has been found out that with the system according to the invention, a multiple back and forth transformation of the signals from the time domain into the frequency domain and vice versa is not necessary during the data transfer from the rotating system into the cell and vice versa. Thus, according to the invention, the control variables are transferred, received and processed only within the time domain.

As a result, the number of sensors can be limited to the number that is required for the detection of the control variables. Thus, a sensor for detecting a frequency signal of the main rotor in particular is no longer necessary.

In a first embodiment of the invention, the system comprises a second control system that is arranged in the cell of the helicopter; and a transfer medium; wherein the first sensor is designed to transmit the at least first control variable to the second control system via the transfer medium, wherein the second control system is designed to receive the at least first control variable via the transfer medium, in order to determine the at least first control value within the time domain by means of the received first control variable in the time domain and by means of the at least first control algorithm and to transmit this control value to the first control system and/or to the adjusting device via the transfer medium (6), wherein the first control system or the adjusting device is configured to receive the control value via the transfer medium.

In this embodiment, the control variable in the time domain is supplied to a control system that is arranged within the cell in the time domain, wherein the transmission is carried out from the rotating system in the cell via a transfer medium. The transfer medium may particularly refer to a rotary transmitter that is designed as a slip ring. But it is also possible to provide a wireless transmission. The second control system in the cell can particularly refer to a second controller, which is supplied with time domain variables. Compared to the first controller in the rotating system, the second controller in the cell can be designed larger, which in particular enables a better computing performance.

The control value that was determined in the cell is transmitted via the transfer medium to the control system and/or to the adjusting device in the rotating system.

Also in this case, the multiple back and forth transforming of signals can be omitted. The sensor for the frequency measurement is also no longer necessary.

The system preferably comprises a second control system that is arranged in the cell of the helicopter; a transfer medium; and a second sensor that is arranged within the cell, which is designed to detect at least one second control variable of the rotor blade actuator within the time domain and to transmit this control variable in the time domain to the second control system via a third signal-based coupling; wherein the second control system is configured to receive the second control variable via the third signal-based coupling, to determine at least a second control value in the time domain by using the received second control variable in the time domain and by using at least a second control algorithm, and to transmit this control value to the first control system and/or to the adjusting device via the transfer medium, wherein the first control system or the adjusting device is configured to receive this control value via the transfer medium.

In this preferred embodiment, a second sensor is arranged within the cell, which can capture control variables of the actuator. The first control variable can continue to be supplied to the first control system in the rotating system. The second control variable can be supplied to the second control system in the cell. The supplied control variables are processed accordingly. The second control value, which was determined by the second control system, can be transmitted both to the first control system as well as to the control system in the rotating system via the transfer medium. It is also possible that the second control system is additionally supplied with control variables from the first sensor which is arranged within the rotating system.

The second sensor, which is arranged in the cell, can detect the same control variables as the first sensor which is arranged within the rotating system. But it can also detect other control variables.

Moreover, it is preferred that the system comprises a third control system that is arranged within the cell of the helicopter; a transfer medium; and a third sensor, which is designed to detect at least one frequency signal of the main rotor and to transmit the frequency signal to the third control system via an at least fourth signal-based coupling; wherein the third control system is configured to receive the frequency signal via the fourth signal-based coupling, to transform the received first control variable in the time domain into a control variable in the frequency domain by using the received frequency signal, to determine a control value in the frequency domain by using the transformed control variable in the frequency domain and by using an at least third control algorithm, to transform the determined control value in the frequency domain into a third control value in the time domain by means of the frequency signal and to transfer this control value in the time domain to the first control system and/or to the adjusting device via the transfer medium, wherein the first control system or the adjusting device is configured to receive this control value via the transfer medium.

The third control system may in particular be a third controller, which can, just like the first and second controller, process sensor signals, but which can be particularly supplied with reference variables in the frequency domain. In this respect it is referred to as a frequency domain controller.

In this particularly preferred embodiment, the third sensor, which is in particular a position or tacho sensor, can generate a frequency signal of the rotor mast or of the main rotor. This sensor can determine a position or a rotation angle of the rotor mast, wherein the position and rotation of the main rotor can be measured with a resolution of at least one measuring point per full rotation.

The third controller can calculate a control value in the frequency domain by means of suitable mathematical procedures, wherein the third control system is supplied with one or more reference values in the frequency domain for this purpose. It is understood that defined reference values within the time domain do not have to be converted or transformed.

Known methods for the transformation into the frequency domain are e.g. the (Fast) Fourier Transformation and discrete Fourier Transformation. For the transformation from the frequency domain into the time domain, the mathematical procedures are inverted accordingly.

Although the system of this preferred embodiment includes a sensor for detecting the frequency, there is still at least one sensor less than it is the case in the prior art. The prior art uses at least two sensors to determine the position or to determine the angle of the main rotor, one of which is arranged within the rotating system and one inside the cell in order to achieve the same phase definition or at least one that is mutually known.

Another advantage of the transfer within the time domain from the rotating system into the cell and vice versa is that, although the data is transmitted slower, it is transmitted in a more robust manner.

It is furthermore preferred that the system comprises a third control system that is arranged inside the cell of the helicopter; a transfer medium; a second sensor that is arranged inside the cell, which is designed to detect at least a second control variable of the rotor blade actuator within the time domain and to transfer this control variable in the time domain to the third control system via a third signal-based coupling; and a third sensor, which is designed to detect at least one frequency signal of the main rotor and to transfer the frequency signal to the third control system via an at least fourth signal-based coupling, wherein the third control system is configured to receive the frequency signal via the signal-based coupling, to transform the received second control variable in the time domain into a control variable in the frequency domain by using the received frequency signal, to determine a control value in the frequency domain by using the transformed control variable in the frequency domain and by using a fifth control algorithm, to transform the determined control value in the frequency domain into a fifth control value in the time domain by means of the received frequency signal and to transfer this control value in the time domain to the first control system and/or to the adjusting device via the transfer medium, wherein the first control system or the adjusting device is configured to receive the fifth control value via the transfer medium.

In this embodiment, the second sensor transfers control variables to the third control unit, wherein the third control unit can transform the second control variables into reference values in the frequency domain by using the frequency signal, determine a control value in the frequency domain and transform it into a control value in the time domain and then transfer it to the control system or adjusting device in the rotating system.

In this way it is possible to combine the data transfer and processing within the rotating system with the one inside the cell in a favorable manner. It is thus possible to e.g. detect such control variables within the rotating system, whose transfer and/or processing only requires a low computing power, while those control variables are detected in the cell, whose transfer and/or processing requires greater computing power. In this embodiment it is also possible to additionally transfer control variables from the rotating system into the cell.

The underlying problem for this invention is also solved by means of a system for a data transfer and processing for the controlling of a rotor blade actuator, wherein the system comprises a fourth control system that is arranged within the rotating system and that is coupled with an adjusting device via signals;

a first sensor that is arranged within the rotating system and that is coupled to the adjusting device via signals, which is designed to detect at least one first control variable of the rotor blade actuator within the time domain and to transfer this control variable in the time domain to the fourth control system via a second signal-based coupling;

a transfer medium; and a third sensor, which is designed to detect at least one frequency signal of the main rotor and to transfer the frequency signal to the fourth control system via the transfer medium;

wherein the fourth control system is configured to receive the frequency signal via the transfer medium, to transform the received first control variable in the time domain into a control variable in the frequency domain by using the received frequency signal, to determine a control value in the frequency domain by using the transformed control variable in the frequency domain and by using an at least fourth control algorithm, to transform the determined control value in the frequency domain into a fourth control value in the time domain by means of the frequency signal and to transfer this control value in the time domain to the adjusting device via the first signal-based coupling, wherein the adjusting device is configured to receive this control value via the first signal-based coupling.

In this case, the detection of the control variable in the rotating system can be carried out by means of the first sensor and the detection of the frequency of the main rotor by means of the third sensor inside the cell. The control variable and the frequency can then be supplied to the fourth control system that is arranged within the rotating system, which in turn can transform it in accordance with corresponding specifications, determine a control value in the frequency domain, invert it into a control value in the time domain, and thus transfer the herein determined control value in the time domain to the adjusting device.

The underlying problem for this invention is furthermore solved by means of a system for a data transfer and processing for the controlling of a rotor blade actuator, wherein this the system comprises an adjusting device that is arranged within the rotating system of the helicopter, which is configured to provide at least one first rotor blade actuator; a transfer medium; a second control system that is arranged inside the cell, and a second sensor that is arranged inside the cell, which is designed to detect at least one second control variable of the rotor blade actuator in the time domain and to transfer this control variable in the time domain to the second control system via a third signal-based coupling; wherein the second control system is configured to receive the second control variable via the third signal-based coupling, to determine at least one second control value in the time domain by using the received control variable in the time domain and by using at least one second control algorithm, and to transfer this control value via the transfer medium to the adjusting device, wherein the adjusting device is designed to receive this control value via the transfer medium.

In this system, the control system is exclusively arranged inside the cell—the first control unit in the rotating system can thus be omitted. Thus, control variables are detected within the rotating system and/or inside the cell, wherein the detecting by means of exclusively one sensor, which is arranged in the cell, is preferred. However, control values are solely determined by means of the control system that is arranged inside the cell, which can then be transferred to the adjusting unit via the transfer medium. The second control system can be supplied with control variables in the time domain.

The underlying problem for this invention is also solved by means of a system for a data transfer and processing for the controlling of a rotor blade actuator, wherein the system comprises an adjusting device that is arranged within the rotating system of the helicopter, which is configured to provide at least one first rotor blade actuator; a third control system that is arranged inside the cell of the helicopter; a transfer medium; a second sensor that is arranged inside the cell, which is configured to detect at least a second control variable of the rotor blade actuator in the time domain and to transfer this control variable in the time domain to the third control system via a third signal-based coupling; and a third sensor which is configured to detect at least one frequency signal of the main rotor and to transfer the frequency signal to the third control system via an at least fourth signal-based coupling; wherein the third control system is configured to receive the frequency signal via the signal-based coupling, to transform the received third control variable in the time domain into a control variable in the frequency domain by using the received frequency signal, to determine a control value in the frequency domain by using the transformed control variable in the frequency domain and by using an at least third control algorithm, to transform the determined control value in the frequency domain into a third control value in the time domain by means of the frequency signal and to transfer this control value in the time domain to the adjusting device via the transfer medium, wherein the adjusting device is designed to receive this control value via the transfer medium.

In this system, the control system is exclusively arranged inside the cell—the first control system in the rotating system can thus be omitted. Thus, control variables are detected within the rotating system and/or inside the cell, wherein the detecting by means of exclusively one sensor, which is arranged in the cell, is preferred. However, control values are solely determined by means of the control system that is arranged inside the cell, which can then be transferred to the adjusting unit via the transfer medium. The second control system can be supplied with control variables in the frequency domain.

The following generally applies for the described systems:

When the system comprises control systems that are either arranged within the rotating system or inside the cell, the controlling of the actuator is exclusively carried out by means of this control system. For a system that comprises a control system that is arranged in both, the rotating system as well as in the cell, it is intended that the controlling of the actuator is carried out either solely by means of the control system that is arranged within the rotating system or solely by means of the one inside the cell or by means of a controller cascade that is based on both control systems. The cascading of the two control systems is preferred because the overall controlled section can thereby be subdivided into smaller sections that can be controlled in a better way. In a cascading, one of the two control systems takes the leading role, wherein it is preferred that the control system, which is arranged inside the cell, functions as a leading control system whose controlling output value i.e. the control value, is the reference value for the control system that is arranged within the rotating system.

In accordance with a further aspect of the invention, a method for the data transfer and processing for the controlling of a rotor blade actuator is provided, wherein the method comprises the following steps:

detecting of at least one first control variable of the actuator in the time domain by means of a first sensor that is arranged within the rotating system of the helicopter;

transmitting of the first control variable in the time domain to a first control system that is arranged within the rotating system via a second signal-based coupling;

receiving of the first control variable in the time domain by means of the first control system via the second signal-based coupling;

determining of a first control value in the time domain by using the received control variable in the time domain and by using at least one first control algorithm;

transmitting of the first control variable to an adjusting device that is arranged within the rotating system via a first signal-based coupling;

receiving of the first control value in the time domain by means of the adjusting device (2) via the first signal-based coupling.

The advantages of the system according to the invention can be transferred analogously to the method according to the invention.

In a first embodiment the method features the following steps:

detecting of at least one second control variable of the actuator in the time domain by means of a second sensor that is arranged inside the cell of the helicopter;

transmitting of this second control variable to a third control system (5b) via a third signal-based coupling;

detecting of at least one frequency signal of the main rotor by means of a third sensor;

transmitting of the frequency signal to the third control system via a fourth signal-based coupling;

receiving of the second control variable and of the frequency signal by means of the third control system via the third or fourth signal-based coupling;

transforming of the received control variable in the time domain by using the received frequency signal into a control variable in the frequency domain by means of the third control system;

determining of a control value in the frequency domain by using the transformed control variable and by using at least a third control algorithm;

transforming of the control value in the frequency domain into a third control value in the time domain by using the received frequency signal;

transferring of the third control value to the first control system or to the adjusting device via the transfer medium;

receiving of the third control value in the time domain by means of the first control system or of the adjusting device via the transfer medium.

In this preferred embodiment, a first control variable is determined in the rotating system which is then supplied to the first control system that is arranged in the rotating system. In the cell, a second control variable is transferred to the third control system that is arranged in the cell. It can then be intended that the second control value, which was determined in the cell, is then transferred to the first control system via the transfer medium as part of a cascade controlling.

A method which comprises the following steps is preferred:

detecting of at least one frequency signal of the main rotor by means of a third sensor;

transmitting of the frequency signal to the control system via a fourth signal-based coupling;

transferring of the first control variable to a third control system that is arranged inside the cell via a transfer medium;

receiving of the first control variable and of the frequency signal by means of the third control system via the transfer medium or the signal-based coupling;

transforming of the received control variable in the time domain by using the received frequency signal into a control variable in the frequency domain by means of the third control system;

determining of a control value in the frequency domain by using the transformed control variable and by using at least a third control algorithm;

transforming of the control value in the frequency domain into a third control value in the time domain by using the received frequency signal;

transferring of the third control value to the first control system or to the adjusting device via the transfer medium;

receiving of the third control value in the time domain by means of the first control system or of the adjusting device via the transfer medium.

In this preferred method, there is no need for a second sensor for detecting a second control variable. The control variables from the first sensor of the rotating system in the time domain are transferred to the third control system inside the cell via the transfer medium and these are then further processed by means of frequency signal that was provided for the third control system.

In addition to this, a method is preferred which comprises the following steps:
transferring of the first control variable to a second control system that is arranged inside the cell via a transfer medium;
receiving of the first control variable by means of the second control system via the transfer medium;
determining of a second control value in the time domain by using the received control variable in the time domain and by using an at least second control algorithm;
transferring of the second control value to the first control system or to the adjusting device via the transfer medium;
receiving of the second control value in the time domain by means of the first control system or of the adjusting device via the transfer medium.

This corresponds to the previously described method, wherein the time domain controller replaces the frequency domain controller.

In like manner, a method is preferred which comprises the following steps:
detecting of at least one second control variable of the actuator in the time domain by means of a second sensor that is arranged inside the cell of the helicopter;
transmitting of the second control variable in the time domain to a second control system (5a) that is arranged inside the cell via a third signal-based coupling;
receiving of the second control variable in the time domain by means of the second control system (5a) via the third signal-based coupling;
determining of a second control value in the time domain by using the received second control variable in the time domain and by using at least a second control algorithm;
transferring of the second control value to the first control system or to the adjusting device that is arranged within the rotating system via the transfer medium;
receiving of the second control value in the time domain by means of the first control system or of the adjusting device via the transfer medium.

In this method, the control variables of the first control system or of the adjusting device that were detected in the cell are supplied in the time domain.

The underlying problem for this invention is also solved by means of a method for a data transfer and processing for the controlling of a rotor blade actuator, comprising the following steps:
detecting of at least one first control variable of the actuator in the time domain by means of a first sensor (4) that is arranged within the rotating system of the helicopter;
transferring of the first control variable in the time domain to a second control system that is arranged inside the cell via a transfer medium;
receiving of the first control variable in the time domain by means of the second control system via the transfer medium;
determining of a second control value in the time domain by using the received control variable in the time domain and by using at least a second control algorithm;
transferring of the second control value to an adjusting device that is arranged within the rotating system via the transfer medium;
receiving of the first control value in the time domain by means of the adjusting device via the transfer medium.

The underlying problem for this invention is also solved by means of a method for a data transfer and processing for the controlling of a rotor blade actuator, comprising the following steps of:
detecting of at least one second control variable of the actuator in the time domain by means of a second sensor that is arranged inside the cell of the helicopter;
transmitting of the second control variable in the time domain to a second control system that is arranged inside the cell via a third signal-based coupling;
receiving of the second control variable in the time domain by means of the second control system via the third signal-based coupling;
determining of a second control value in the time domain by using the received second control variable in the time domain and by using at least a second control algorithm;
transferring of the second control value to a first adjusting device that is arranged within the rotating system via the transfer medium;
receiving of the second control value in the time domain by means of the adjusting device via the transfer medium.

This method exclusively uses the second control system that is arranged inside the cell and omits a control system which is arranged within the rotating system.

The underlying problem for this invention is also solved by means of a method for a data transfer and processing for the controlling of a rotor blade actuator, comprising the following steps of:
detecting of at least one first control variable of the actuator in the time domain by means of a first sensor that is arranged within the rotating system of the helicopter;
detecting of at least one frequency signal of the main rotor by means of a third sensor;
transmitting of the first control variable in the time domain to a fourth control system that is arranged within the rotating system via a second signal-based coupling;
transferring of the frequency signal to the fourth control system via a transfer medium;
receiving of the first control variable in the time domain and of the frequency signal by means of the fourth control system via the second signal-based coupling or the transfer medium;
transforming of the received control variable in the time domain by using the received frequency signal into a control variable in the frequency domain by means of the fourth control system;
determining of a control value in the frequency domain by using the transformed control variable and by using at least a fourth control algorithm;
transforming of the control value in the frequency domain into a fourth control value in the time domain by using the received frequency signal;
transmitting of the fourth control value to an adjusting device via a first signal-based coupling;
receiving of the fourth control value in the time domain by means of the adjusting device via the first signal-based coupling.

The determining of the control value is herein carried out by means of the control system that is arranged within the rotating system, which can particularly refer to a frequency domain controller, wherein this one is supplied with the frequency signal from the cell as well as the control variable of the first sensor.

The advantage of the methods according to the invention and of the preferred embodiments can be collectively summarized in that the data transfer and processing for the controlling of a rotor blade actuator does not need any, or at least less transforming back and forth than the methods of the prior art. This applies in both cases, for the use of time domain controllers as well as for frequency domain controllers. It is furthermore possible to reduce the plurality of components in accordance with the invention, in particular, it does not require any frequency sensor or at least the number of frequency sensors is lower than in the prior art.

Figure 2:
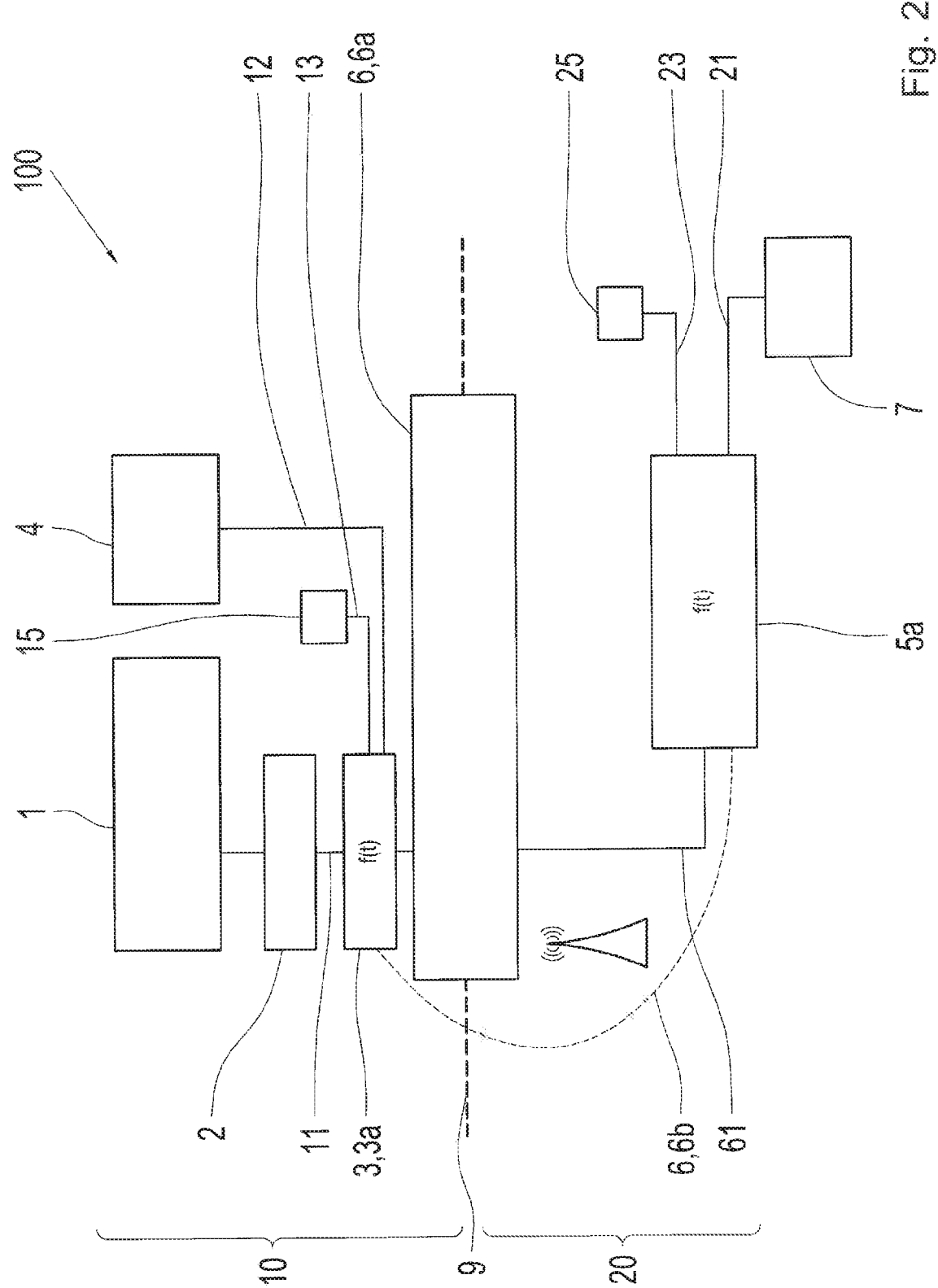
Figure 3:
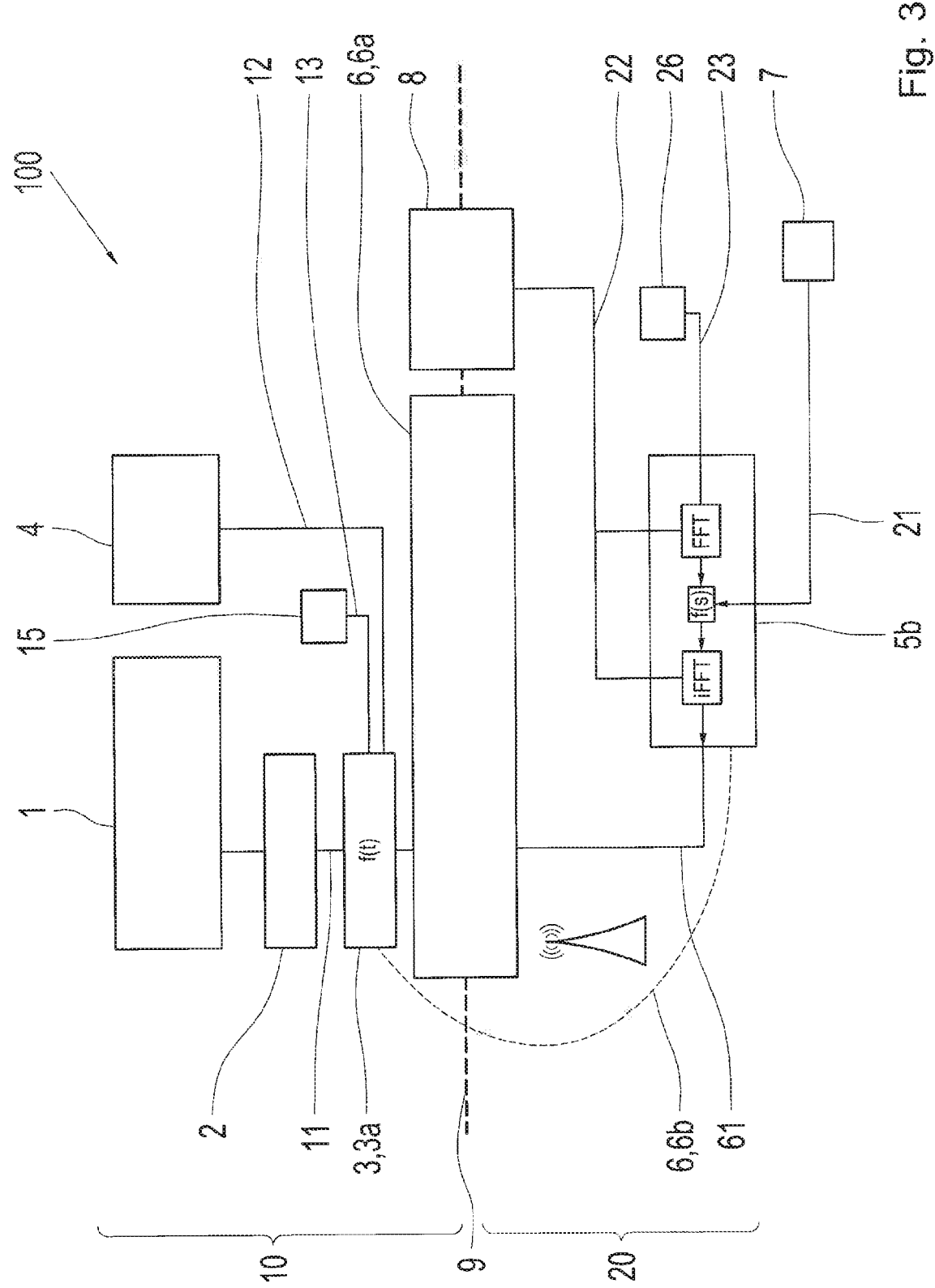
Figure 4:
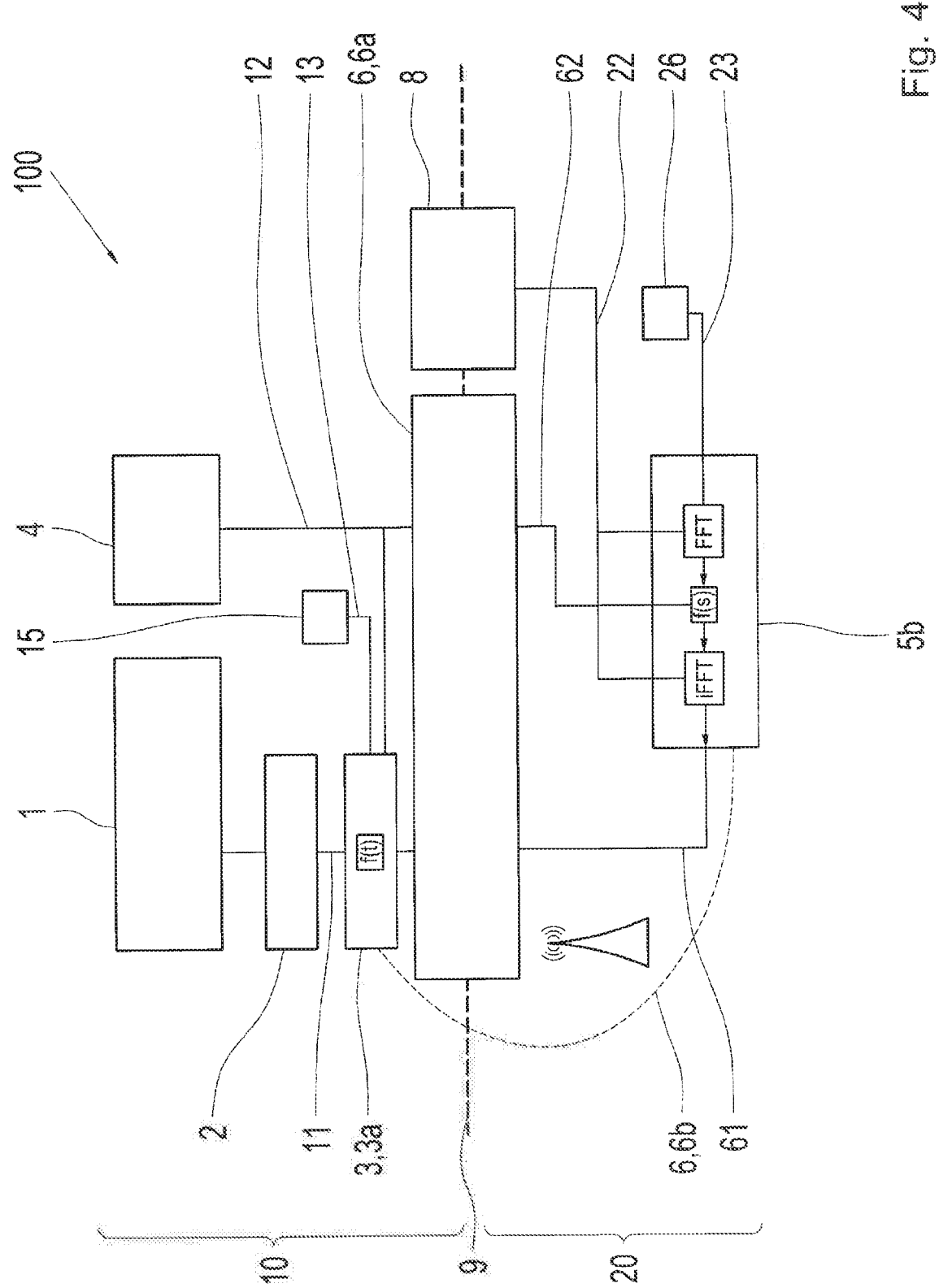
Figure 5:
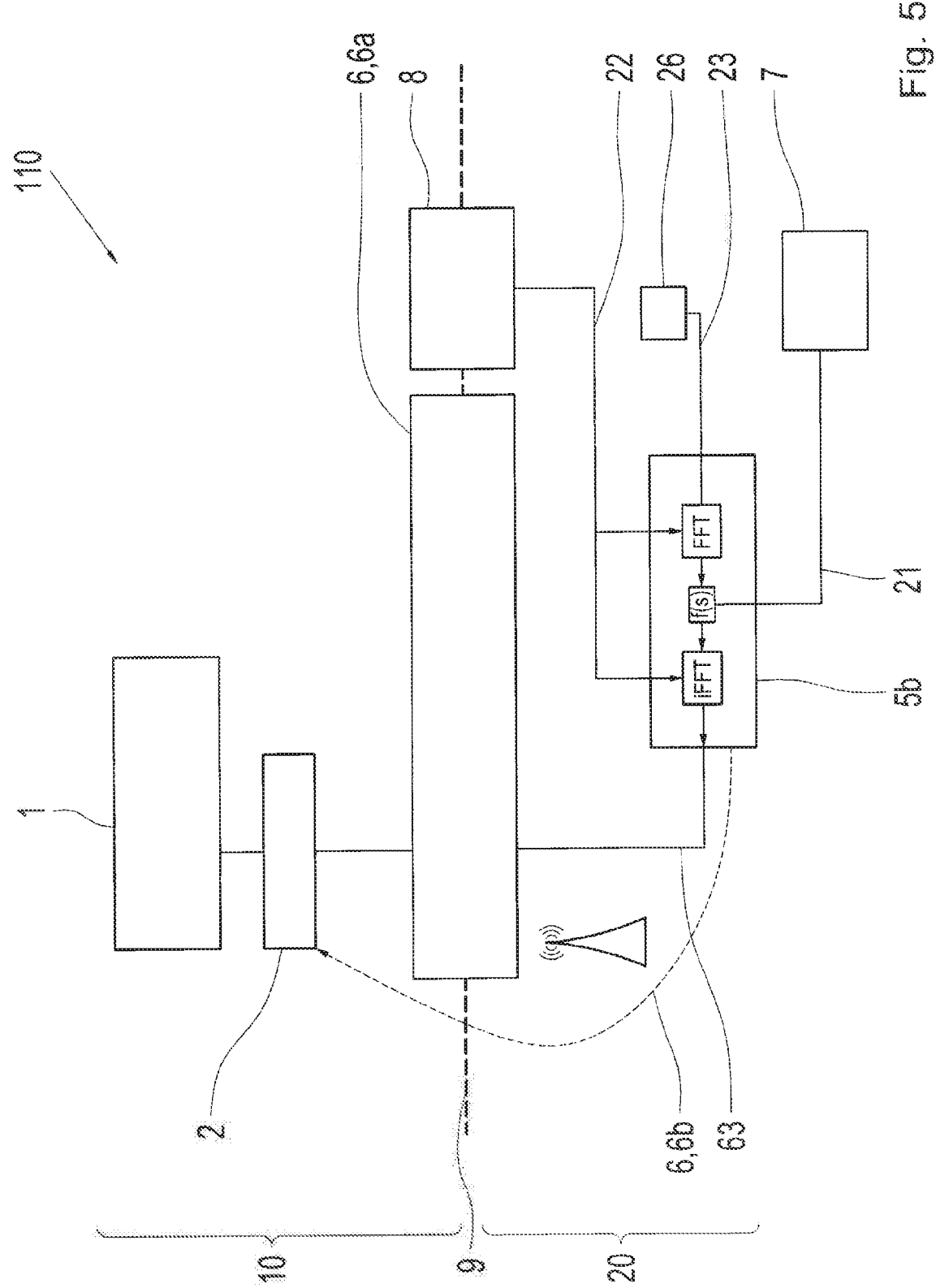
Figure 6:
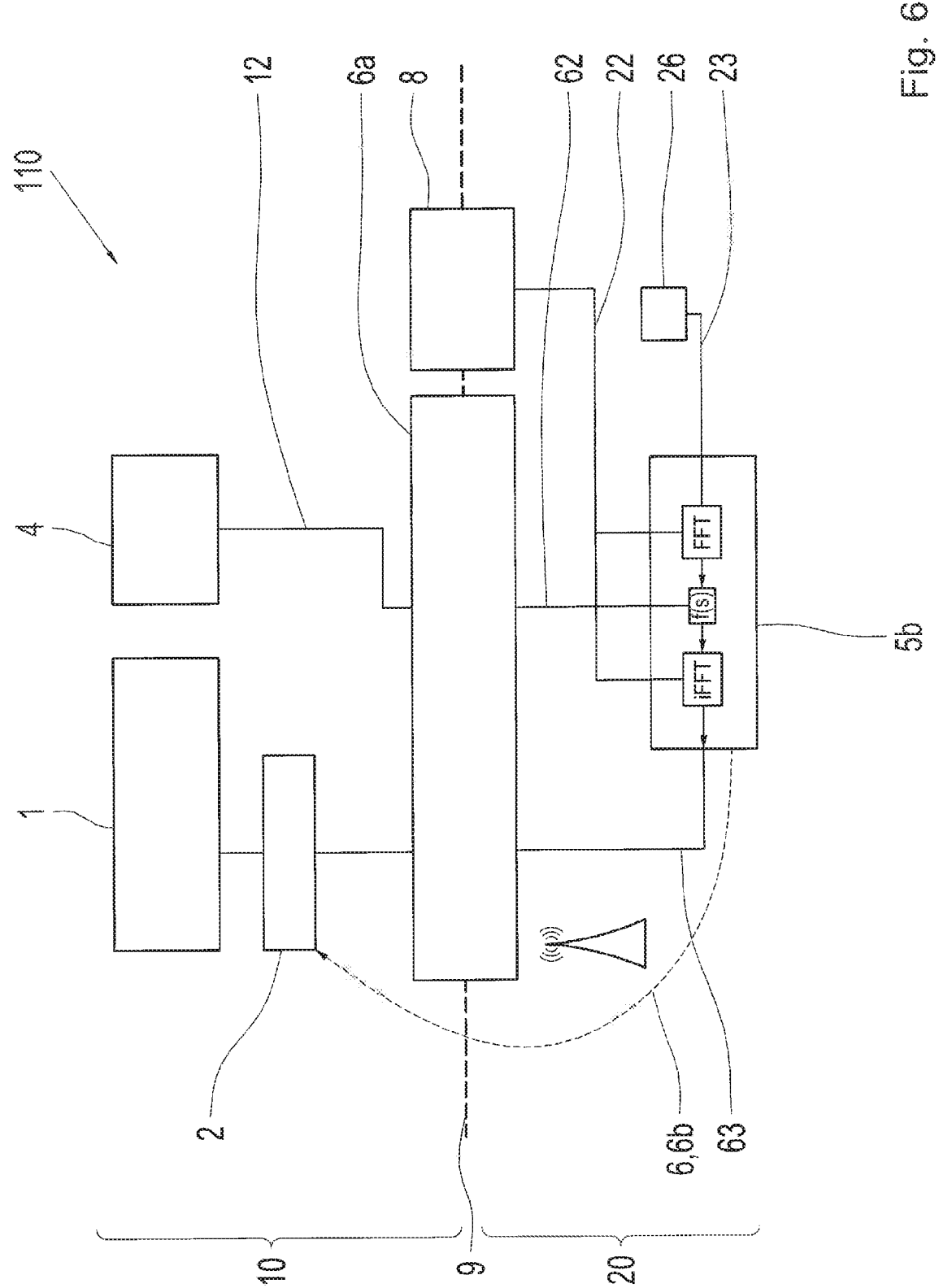

The invention is explained in more detail by means of the following figures. The drawings show FIG. 1 a first system according to the invention in a schematic representation;

FIG. 2 a first embodiment of the first system according to the invention in a schematic representation;

FIG. 3 a preferred embodiment of the first system according to the invention in a schematic representation;

FIG. 4 a further preferred embodiment of the first system according to the invention in a schematic representation;

FIG. 5 a second system according to the invention in a schematic representation;

FIG. 6 a first embodiment of the second system according to the invention in a schematic representation;

FIG. 7 a preferred embodiment of the second system according to the invention in a schematic representation;

FIG. 8 a third system according to the invention in a schematic representation;

FIG. 9 a method according to the invention in a first representation.

The following FIGS. 1 to 8 show systems according to the invention and their preferred embodiments. FIG. 9 shows a method according to the invention. Equal components are identified with the same reference signs.

The system 100 that is shown in FIG. 1 for the data transfer and processing for the controlling of a rotor blade actuator comprises an actuator 1, which is configured as an electrically adjustable control rod, a control element 2 that is designed as a power electronics unit, a first control system 3 that is configured as a time domain controller 3a and a first sensor 4, wherein these components are arranged within the rotating system 10, or on the rotor head of a not depicted helicopter.

Sensor 4 detects control variables of actuator 1 such as e.g. position, pressure and the strength of the current in the time domain and transmits these via a second signal-based coupling 12 to the time domain controller 3a. This can be carried out both, in a wired as well as in a wireless manner. By means of a reference value presetting device 15, reference values in the time domain are supplied to controller 3a via a fourth signal-based coupling 13. Controller 3a receives the reference values and determines a first control value in the time domain by means of the reference values and a suitable control algorithm and supplies these to control element 2 via a first signal-based coupling 11. Thereafter, control element 2 adjusts actuator 1 in accordance with the control value. System 100 according to FIG. 1 allows for a data transfer and processing for the controlling of a rotor blade actuator without any transforming of the control variables from the time domain into the frequency domain or vice versa. The controlling of actuator 1 is carried out exclusively by means of the first controller 3a.

The system in FIG. 2 is differentiated from the system according to FIG. 1 by an additional second time domain controller 5a and a second sensor 7, which is coupled 21 to the second time domain controller 5a via signals. The second sensor 7 detects more control variables of actuator 1 and supplies these to controller 5a via the third signal-based coupling 21.

By means of a reference value presetting device 25, reference values in the time domain are supplied to controller 5a via a fifth signal-based coupling 23. Controller 5a receives the reference value(s) of the second sensor 7 and determines a second control value in the time domain by means of the supplied reference values and by means of a suitable control algorithm and supplies these to controller 3a via a signal-based coupling 61 by means of a transfer medium 6 which is designed as a slip ring 6a. However, a radio transmission is also possible, which is shown by means of the dashed line 6b. The controlling of actuator 1 is carried out by means of the first and the second controller, wherein both controllers 3a, 5a cooperate in a cascade-like manner. However, it is also possible that the second controller 5a supplies the second control value directly to control element 2.

FIG. 3 shows a further embodiment of system 100 in accordance with the invention. Instead of the second controller 5a, a frequency domain controller 5b is provided, which is arranged inside the cell 20. By means of a third sensor 8, which is configured as a tacho sensor, frequency signals of the main rotor 9 are detected and supplied to controller 5b via a fourth signal-based coupling 22. By means of a reference value presetting device 26, reference values in the frequency domain are supplied to controller 5b via a sixth signal-based coupling 23. Sensor 7 detects control variables in the time domain and supplies these to controller 5b via the signal-based coupling 21. Controller 5b primarily transforms the reference value in the time domain into a reference value in the frequency domain by using the frequency signal and determines a control value in the frequency domain by means of a suitable control algorithm, which is subsequently transformed back into a third control value in the time domain by using the frequency signal. This third control value is then transferred to the first controller 3a by means of a signal-based coupling 61 via slip ring 6a. A transmission via radio 6b is also possible in this case. The controlling of actuator 1 is carried out by means of cascade controlling also in this case.

FIG. 4 shows system 100 according to the invention in an embodiment in which the control variables of the first sensor 4 are supplied to the third controller 5b via a signal-based coupling 62 via slip ring 6a. A second sensor 7 that is arranged inside the cell is not required.

FIG. 5 shows a system 110, in which—in contrast to the previous systems—the controlling is exclusively carried out by means of controller 5b inside of cell 20, which means that the transmitting of the control value, which was determined by controller 5b, is carried out directly from cell 20 to the control element 2 in the rotating system by means of a signal-based coupling 63 via slip ring 6a.

In the system 110 of FIG. 6, sensor 4 detects the control variables and supplies these to controller 5b by means of a signal-based coupling 62 via slip ring 6a. The control value, which is determined by means of controller 5b, is directly transmitted to the control element by means of a signal-based coupling 63 via slip ring 6a.

The system 110 in FIG. 7 corresponds to the one of FIG. 6, wherein the time domain controller 5a determines the control values and is thus supplied with the necessary control variables from the first sensor 4.

The system 120 in FIG. 8 corresponds to that of FIG. 1, wherein a frequency domain controller 3b determines the control values in the time domain by using the frequency signal, which was detected by sensor 8 and which was supplied by means of a signal-based coupling 64, by means of a corresponding control algorithm and by using appropriate reference values in the frequency domain, which are supplied to controller 3b by means of a reference value presetting device 16 via the signal-based coupling, and transmits these to actuator 2 via the signal-based coupling 11. The controlling of the actuator in system 120 is carried out exclusively by means of controller 3b.

FIG. 9 shows a process sequence 200 in accordance with the invention for the data transfer and processing for the controlling of a rotor blade actuator.

In a first step 210, control variables in the time domain of an actuator 1, which is designed as an electrically adjustable control rod, are detected by means of a second sensor 7 and transmitted to a frequency domain controller 5b in a second subsequent step 220 via a first signal-based coupling 21. The frequency domain controller 5b that is shown in FIG. 9 is a vibration controller. However, other frequency domain controllers are also possible.

In a third step 230, the frequency of the main rotor (not depicted) is determined by means of a third sensor 8, which is configured as a tacho sensor, and then transmitted to controller 5b in a subsequent step 240 via a fourth signal-based coupling 22.

In a fifth step 250, the control variable in the time domain is transformed into a control variable in the frequency domain by using the frequency signal that was supplied by the tacho sensor via Fast Fourier-Transformation (FFT).

In a sixth step 260, a reference value presetting device 26 supplies controller 5b with reference values in the frequency domain via a signal-based coupling 23.

In a seventh step 270, controller 5b determines a corresponding control value in the frequency domain by means of a suitable control algorithm by using the reference value and the control value in the frequency domain.

In an eighth step 280, controller 5b transforms the control value from the frequency domain into a first control value in the time domain by using the frequency signal by means of inverse Fast Fourier-Transformation (iFFT).

In a ninth step 290, controller 5b transmits the first control value in the time domain to a first time domain controller 3a that is arranged on the rotor head, or within the rotating system 10 via a slip ring 6a. The time domain controller 3a is a position controller. However, other time domain controllers are also possible.

In a tenth step 300, a first controller 4, which is arranged on the rotor head, detects control variables of actuator 1 in the time domain. This sensor 4 is a position sensor, wherein other sensors are also possible depending on what is required.

In an eleventh step 310, position sensor 4 transmits the control variables to controller 3a via a signal-based coupling 12.

In a twelfth step 320, controller 3a determines a corresponding second control value in the time domain by means of a suitable control algorithm by using a supplied reference value in the time domain (not shown) and the control variable in the time domain.

In a thirteenth step 330, controller 3a transmits the first control value and the second control value to control element 2 via a signal-based coupling. Control element 2 subsequently adjusts actuator 1 in accordance with the received control values in a fourteenth step 340.

The described method includes a preferred cascade controlling, which means that controller 5b inside cell 20 and controller 3a on rotor head 10 regulate actuator 1. However, other variations are also possible. It is thus also possible that the frequency domain controller 5b of cell 20 is configured as a time domain controller 5a, wherein frequency sensor 8 and the Fourier Transformations could then be omitted without substitution.

A variation without the controller in the rotating system 10 is also possible. This is indicated by the shaded area A, which extends from the lower left towards the upper right. In such an embodiment, the controller inside the cell would transmit the determined control value directly to the adjusting device 2 via slip ring 6a.

It is also possible to transmit the control variables in the time domain that were detected by means of sensor 4, which is arranged within the rotating system 10, to the controller inside of cell 20. This is indicated by the shaded area B, which extends from the lower right towards the upper left. The values that were brought back from the rotating system 10 into cell 20 can particularly be used for the system identification. However, it is also possible to detect control variables for the frequency domain controller 5b and to transmit these to this controller.

It is clear to an expert, that the method in FIG. 9 is not limited to the temporal sequence as it is indicated in the timeline. Rather, the steps may be carried out in any other permissible order or at least partially simultaneous.

LIST OF REFERENCE SIGNS 1 rotor blade actuator
2 adjusting device, control element, valve, power electronics unit
3, 3a first control system, controller, time domain controller
3b fourth control system, controller, frequency domain controller
4 first sensor
5a second control system, controller, time domain controller
5b third control system, controller, frequency domain controller
6 transfer medium
6a transfer medium wired, rotary transmitter, slip ring
6b transfer medium wireless, radio
7 second sensor
8 third sensor, position sensor, tacho sensor
9 main rotor,
10 rotating system, rotor head
11-13 signal-based coupling
15 first reference value presetting device
20 cell
21-23 signal-based coupling
25 second reference value presetting device
26 third reference value presetting device
61-64 signal-based coupling

The invention claimed is:

1. A system for the data transfer and processing for the controlling of a rotor blade actuator, the system comprising:
an adjusting device that is arranged within a rotating system of a helicopter, which is configured to provide at least one first rotor blade actuator;
a first control system that is arranged within the rotating system and that is coupled via signals to the adjusting device;
a first sensor that is arranged within the rotating system which is designed to detect at least one first control variable of the rotor blade actuator in the time domain and to transmit this control variable in the time domain to the first control system via a second signal-based coupling;

wherein the first control system is configured to receive the first control variable via the signal-based coupling, to determine at least one first control value in the time domain by processing the received control variable using at least one first control algorithm in the time domain, and to transmit this control value to the adjusting device via the first signal-based coupling, wherein the adjusting device is designed to receive this control value via the first signal-based coupling.

2. The system according to claim 1, further comprising:
a second control system that is arranged inside a cell of the helicopter; and
a transfer medium;
wherein the first sensor is configured to transfer the first control variable to the second control system via the transfer medium;
wherein the second control system is configured to receive the at least first control variable via the transfer medium, to determine the at least first control value in the time domain by the received first control variable in the time domain and by the at least first control algorithm, and to transmit this control value to the first control system and/or to the adjusting device via the transfer medium, wherein the first control system or the adjusting device is configured to receive this control value via the transfer medium.

3. The system according to claim 1, further comprising:
a second control system that is arranged inside the cell of the helicopter;
a transfer medium;
a second sensor that is arranged inside the cell, which is designed to detect at least one second control variable of the rotor blade actuator in the time domain and to transmit this second control variable in the time domain to the second control system via a third signal-based coupling;
wherein the second control system is configured to receive the second control variable via the third signal-based coupling, to determine at least a second control value in the time domain by using the received second control variable in the time domain and by using at least a second control algorithm, and to transmit this control value to the first control system and/or to the adjusting device via the transfer medium, wherein the first control system or the adjusting device is configured to receive this control value via the transfer medium.

4. The system according to claim 1, further comprising:
a third control system that is arranged inside the cell of the helicopter;
a transfer medium;
a third sensor, which is configured to detect at least one frequency signal of the main rotor and to transmit the frequency signal to the third control system via an at least fourth signal-based coupling;
wherein the third control system is configured to receive the frequency signal via the fourth signal-based coupling, to transform the received first control variable in the time domain into a control variable in the frequency domain by using the received frequency signal, to determine a control value in the frequency domain by using the transformed control variable in the frequency domain and by using an at least third control algorithm, to transform the determined control value in the frequency domain into a third control value in the time domain by the frequency signal and to transfer this control value in the time domain to the first control system and/or to the adjusting device via the transfer medium, wherein the first control system or the adjusting device is configured to receive this control value via the transfer medium.

5. The system according to claim 1, further comprising:
a third control system that is arranged inside the cell of the helicopter;
a transfer medium;
a second sensor that is arranged inside the cell, which is designed to detect at least one second control variable of the rotor blade actuator in the time domain and to transmit this control variable in the time domain to the third control system via a third signal-based coupling;
a third sensor, which is configured to detect at least one frequency signal of the main rotor and to transmit the frequency signal to the third control system via an at least fourth signal-based coupling;
wherein the third control system is configured to receive the frequency signal via the signal-based coupling, to transform the received second control variable in the time domain into a control variable in the frequency domain by using the received frequency signal, to determine a control value in the frequency domain by using the transformed control variable in the frequency domain and by using a fifth control algorithm, to transform the determined control value in the frequency domain into a fifth control value in the time domain by the received frequency signal and to transfer this control value in the time domain to the first control system and/or to the adjusting device via the transfer medium, wherein the first control system or the adjusting device is configured to receive the fifth control value via the transfer medium.

6. A system for the data transfer and processing for the controlling of a rotor blade actuator, the system comprising
a fourth control system that is arranged within a rotating system and that is coupled with an adjusting device via signals,
a first sensor that is arranged within the rotating system and that is coupled to the adjusting device via signals, which is designed to detect at least one first control variable of the rotor blade actuator in the time domain and to transfer this control variable in the time domain to the fourth control system via a second signal-based coupling;
a transfer medium;
a third sensor, which is designed to detect at least one frequency signal of the main rotor and to transmit the frequency signal to the fourth control system via the transfer medium;
wherein the fourth control system is configured to receive the frequency signal via the transfer medium, to transform the received first control variable in the time domain into a control variable in the frequency domain by using the received frequency signal, to determine a control value in the frequency domain by processing the transformed control variable using an at least fourth control algorithm in the frequency domain, to transform the determined control value in the frequency domain into a fourth control value in the time domain by the frequency signal and to transmit this control value in the time domain to the adjusting device via the first signal-based coupling, wherein the adjusting device is configured to receive the determined control value via the first signal-based coupling.

7. A system for the data transfer and processing for the controlling of a rotor blade actuator, the system comprising:

an adjusting device that is arranged within a rotating system of the helicopter, which is configured to provide at least one first rotor blade actuator;

a transfer medium;

a second control system that is arranged inside the cell;

a second sensor that is arranged inside the cell, which is designed to detect at least one second control variable of the rotor blade actuator in the time domain and to transmit this control variable in the time domain to the second control system via a third signal-based coupling;

wherein the second control system is configured to receive the second control variable via the third signal-based coupling, to determine at least one second control value in the time domain by using the received control variable in the time domain and by using at least one second control algorithm, and to transfer this control value in the time domain via the transfer medium to the adjusting device, wherein the adjusting device is designed to receive this control value in the time domain via the transfer medium.

8. A system for the data transfer and processing for the controlling of a rotor blade actuator, the system comprising:

an adjusting device that is arranged within a rotating system of the helicopter, which is configured to provide at least one first rotor blade actuator;

a third control system that is arranged inside the cell of the helicopter;

a transfer medium;

a second sensor that is arranged inside the cell, which sensor is designed to detect at least one second control variable of the rotor blade actuator in the time domain and to transmit this control variable in the time domain to the third control system via a third signal-based coupling a third sensor, which is configured to detect at least one frequency signal of the main rotor and to transmit the frequency signal to the third control system (5b) via an at least fourth signal-based coupling;

wherein the third control system is configured to receive the frequency signal via the signal-based coupling, to transform the received third control variable in the time domain into a control variable in the frequency domain by using the received frequency signal, to determine a control value in the frequency domain by using the transformed control variable in the frequency domain and by using an at least third control algorithm, to transform the determined control value in the frequency domain into a third control value in the time domain by the frequency signal and to transfer this control value in the time domain to the adjusting device via the transfer medium, wherein the adjusting device is designed to receive this control value in the time domain via the transfer medium.

9. A method for the data transfer and processing for the controlling of a rotor blade actuator, comprising the steps of:

detecting of at least one first control variable of an actuator in the time domain by a first sensor that is arranged within a rotating system of the helicopter;

transmitting of the first control variable in the time domain to a first control system that is arranged within the rotating system via a second signal-based coupling;

receiving of the first control variable in the time domain by the first control system via the second signal-based coupling;

determining, by the first control system, a first control value by processing the received control variable using at least one first control algorithm in the time domain;

transmitting of the first control variable to an adjusting device that is arranged within the rotating system via a first signal-based coupling; and receiving of the first control value in the time domain by the adjusting device via the first signal-based coupling.

10. The method according to claim 9, further comprising the steps of:

detecting of at least a second control variable of the actuator in the time domain by a second sensor that is arranged inside the cell of the helicopter;

transmitting the second control variable to a third control system via a third signal-based coupling;

detecting at least one frequency signal of the main rotor by a third sensor;

transmitting of the frequency signal to the third control system via a fourth signal-based coupling;

receiving of the second control variable and of the frequency signal by the third control system via the third or fourth signal-based coupling;

transforming of the received control variable in the time domain by using the received frequency signal into a control variable in the frequency domain by the third control system;

determining of a control value in the frequency domain by using the transformed control variable and by using at least a third control algorithm;

transforming of the control value in the frequency domain into a third control value in the time domain by using the received frequency signal;

transferring the third control value to the first control system or to the adjusting device via the transfer medium;

receiving the third control value in the time domain by the first control system or the adjusting device via the transfer medium.

11. The method according to claim 9, further comprising the steps of:

detecting of at least one frequency signal of the main rotor by a third sensor;

transmitting of the frequency signal to the control system via a fourth signal-based coupling;

transferring of the first control variable to a third control system that is arranged inside the cell via a transfer medium;

receiving the first control variable and the frequency signal by the third control system via the transfer medium or the signal-based coupling;

transforming of the received control variable in the time domain by using the received frequency signal into a control variable in the frequency domain by the third control system;

determining of a control value in the frequency domain by using the transformed control variable and by using at least a third control algorithm;

transforming of the control value in the frequency domain into a third control value in the time domain by using the received frequency signal;

transferring of the third control value to the first control system or to the adjusting device via the transfer medium;

receiving of the third control value in the time domain by the first control system or of the adjusting device via the transfer medium.

12. The method according to claim 9, further comprising the steps of:
- transferring the first control variable to a second control system that is arranged inside the cell via a transfer medium;
- receiving the first control variable by the second control system via the transfer medium;
- determining of a second control value in the time domain by using the received control variable in the time domain and by using an at least second control algorithm;
- transferring of the second control value to the first control system or to the adjusting device via the transfer medium;
- receiving of the second control value in the time domain by the first control system or of the adjusting device via the transfer medium.

13. The method according to claim 9, further comprising the steps of:
- detecting at least a second control variable of the actuator in the time domain by a second sensor that is arranged inside the cell of the helicopter;
- transmitting the second control variable in the time domain to a second control system that is arranged inside the cell (20) via a third signal-based coupling;
- receiving the second control variable in the time domain by the second control system via the third signal-based coupling;
- determining a second control value in the time domain by using the received second control variable in the time domain and by using at least a second control algorithm;
- transferring the second control value to the first control system or to the adjusting device that is arranged within the rotating system via the transfer medium;
- receiving the second control value in the time domain by the first control system or of the adjusting device via the transfer medium.

14. A method for the data transfer and processing for the controlling of a rotor blade actuator, comprising the steps of:
- detecting of at least one first control variable of the actuator in the time domain by a first sensor that is arranged within the rotating system of a helicopter;
- transferring of the first control variable in the time domain to a second control system that is arranged inside the cell via a transfer medium;
- receiving the first control variable in the time domain by the second control system via the transfer medium;
- determining a second control value in the time domain by using the received control variable in the time domain and by using at least a second control algorithm;
- transferring the second control value in the time domain to an adjusting device that is arranged within the rotating system via the transfer medium;
- receiving the first control value in the time domain by the adjusting device via the transfer medium.

15. A method for the data transfer and processing for the controlling of a rotor blade actuator, comprising the steps of:
- detecting of at least a second control variable of the actuator in the time domain by a second sensor that is arranged inside a cell of a helicopter;
- transmitting of the second control variable in the time domain to a second control system that is arranged inside the cell via a third signal-based coupling;
- receiving the second control variable in the time domain by the second control system via the third signal-based coupling;
- determining a second control value in the time domain by using the received second control variable in the time domain and by using at least a second control algorithm;
- transferring the second control value in the time domain to a first adjusting device that is arranged within the rotating system via a transfer medium;
- receiving the second control value in the time domain by means of the adjusting device via the transfer medium.

16. A method for the data transfer and processing for the controlling of a rotor blade actuator, comprising the steps of:
- detecting of at least one first control variable of the actuator in the time domain by a first sensor that is arranged within the rotating system of the helicopter;
- detecting at least one frequency signal of the main rotor by a third sensor;
- transmitting the first control variable in the time domain to a fourth control system that is arranged within the rotating system via a second signal-based coupling;
- transferring of the frequency signal to the fourth control system via a transfer medium;
- receiving the first control variable in the time domain and of the frequency signal by the fourth control system via the second signal-based coupling or the transfer medium;
- transforming the received control variable in the time domain by using the received frequency signal into a control variable in the frequency domain by the fourth control system;
- determining, by the fourth control system, a control value in the frequency domain by processing the transformed control variable using at least a fourth control algorithm in the frequency domain;
- transforming the control value in the frequency domain into a fourth control value in the time domain by using the received frequency signal;
- transmitting of the fourth control value to an adjusting device via a first signal-based coupling;
- receiving of the fourth control value in the time domain by the adjusting device via the first signal-based coupling.

* * * * *